United States Patent
Spindelbalker

(10) Patent No.: US 7,014,312 B2
(45) Date of Patent: Mar. 21, 2006

(54) MOUNT FOR TWO FRAMELESS SPECTACLE LENSES

(75) Inventor: Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 0 days.

(21) Appl. No.: 10/474,285

(22) PCT Filed: May 3, 2002

(86) PCT No.: PCT/AT02/00135

§ 371 (c)(1),
(2), (4) Date: Oct. 6, 2003

(87) PCT Pub. No.: WO02/091063

PCT Pub. Date: Nov. 14, 2002

(65) Prior Publication Data

US 2004/0090595 A1     May 13, 2004

(30) Foreign Application Priority Data

May 3, 2001     (AT) ............................... A713/2001

(51) Int. Cl.
*G02C 1/00* (2006.01)

(52) U.S. Cl. ....................................... 351/41; 351/47

(58) Field of Classification Search .................. 351/83, 351/86, 103, 106, 110, 41, 47, 57, 138
See application file for complete search history.

(56) References Cited

U.S. PATENT DOCUMENTS

| | | | |
|---|---|---|---|
| 3,453,042 A | | 7/1969 | Cooper |
| 3,846,017 A | * | 11/1974 | Ferrell ........................ 351/106 |
| 5,007,727 A | | 4/1991 | Kahaney et al. |
| 5,412,438 A | | 5/1995 | Bolle' |
| 5,502,516 A | | 3/1996 | Elterman |
| 5,790,230 A | * | 8/1998 | Sved ........................... 351/138 |
| 5,929,963 A | | 7/1999 | McNeal |

FOREIGN PATENT DOCUMENTS

| | | |
|---|---|---|
| DE | 3413872 | 10/1984 |
| DE | 19604790 | 8/1997 |
| WO | WO9834150 | 8/1998 |

* cited by examiner

*Primary Examiner*—Hung Xuan Dang
(74) *Attorney, Agent, or Firm*—Collard & Roe, P.C.

(57) ABSTRACT

A fastener device for two frameless spectacle lenses (2) comprises a nose support provided between the spectacle lenses (2) and supporting parts (4) provided in the region of the nose support onto which the spectacle lenses (2) are glued. In order to provide advantageous bonding conditions it is proposed that the supporting parts (4) comprise flexurally soft supports (3) made of plastic, onto which the spectacle lenses (2) are glued along a face-side circumferential section.

8 Claims, 3 Drawing Sheets

US 7,014,312 B2

MOUNT FOR TWO FRAMELESS SPECTACLE LENSES

CROSS REFERENCE TO RELATED APPLICATIONS

Applicant claims priority under 35 U.S.C. §119 of Austrian Application No. A713/2001 filed on 3 May 2001. Applicant also claims priority under 35 U.S.C. §365 of PCT/AT02/00135 filed on 3 May 2002. The international application under PCT article 21(2) was not published in English.

FIELD OF THE INVENTION

The invention relates to a fastener device for two frameless spectacle lenses with a nose support disposed between the spectacle lenses and with supporting parts disposed in the region of the nose support onto which the spectacle lenses are glued.

DESCRIPTION OF THE PRIOR ART

In order to equip sunglasses in an optional fashion with an optical lens insert it is known (DE 34 13 872) to provide a plug-in coupling in the region of the nose saddle of the sunglasses with the help of which an optical lens insert can be connected, such that the nose saddle of the frame for the lenses of the optical lens insert is pressed into latching recesses between the clamping jaws of the plug-in coupling. Since the optical lens insert advantageously assumes the nose support of the sunglasses via a bow-shaped nose-piece, which in the region of its support legs is fastened to the frame of the optical lens insert, it is necessary to provide a separate nose support when using the sunglasses without an optical lens insert. In order to enable said nose support to be connected to the sunglasses via the plug-in coupling in the region of the nose saddle, the nose support is provided with a frame bracket which cooperates with the plug-in coupling between whose legs a bow-shaped nose-piece is fastened. The disadvantageous aspect in such known spectacles which can optionally be equipped with a nose support or an optical lens insert is that the lens insert requires a frame carrying the optical lenses, which not only increases the weight of the optical lens insert but also makes the lens insert visible through the spectacles.

When the optical lens insert is fastened to a nose-piece in another known construction (U.S. Pat. No. 5,412,438 A) which is inserted in a nose recess of an integral sunshade shield of sunglasses, the nose-piece must be provided with an upwardly projecting fastening set-off which is provided on the inside of the sunshade shield on which the optical lens insert is inserted with a nose bracket which is bent in a U-shaped manner towards the sunshade shield. This means that a complex nose-piece with a projecting, flexurally rigid fastening set-off for the lens insert is required, which necessitates separate nose-pieces for the sunglasses without an optical lens insert. As a result of the nose bracket bent out towards the sunshade shield it is necessary to provide a frame for the optical lenses with the disadvantages that have already been mentioned above.

It is finally known (U.S. Pat No. 5,790,230) to provide bridges projecting towards the lenses for the purpose of the frameless fastening of optical lenses of a lens insert for sunglasses, with the lenses being glued onto the bridges. The disadvantageous aspect in said known glued connection is first that the bridges cover an edge section of the lenses. Moreover, tensions occur in the adhesive layer as a result of different thermal expansions of the lenses and the nose support, which can lead to a detachment of the adhesive connection. As a result of the use of suitable, comparatively brittle adhesive materials there is also a considerable likelihood of breakage for the lenses when they are moved relative to the nose support because the nose support requires a certain dimensional stability.

SUMMARY OF THE INVENTION

The invention is thus based on the object of avoiding these deficiencies and to provide a fastener device for two frameless lenses of the kind mentioned above in such a way that a durable, sufficiently sturdy adhesive connection can be achieved between the lenses and the nose support without having to cover the edge sections of the lenses.

This object is achieved by the invention in such a way that the supporting parts comprise flexurally soft supports made of plastic material to which the lenses are glued along a face-side circumferential section.

Since as a result of these measures the lenses are not connected directly with the supporting parts but through a flexurally soft support, the flexurally soft support provides a compensation for the tensions from different thermal expansions of the lenses and the supporting parts and from mechanical stresses of the lenses, so that the adhesive layers which are relatively brittle after the curing can be kept substantially free from tensions. Despite the flexurally soft support, a favorable dimensional stability for the fastener device of the lenses is ensured through the supporting parts which can be provided with a sufficiently flexurally rigid design. Since the gluing of the lenses occurs along a face-side circumferential section, the free glass surface area is not restricted by the fastener device. An additional factor is that the adherence of the adhesive layer to the lenses cannot be impaired by the usual coatings of the lenses because the face-sides of the lenses do not have any such coatings.

The flexurally soft supports of the supporting parts not only constitute a durably, sufficiently sturdy fastening of the lenses by gluing, but also allow swiveling out the lenses from a predetermined basic position within the scope of the elastic properties of the support, which can be used advantageously for cleaning the glasses for example. In order to enable a sufficient swiveling angle without overloading the supports or the adhesive layers, the flexurally soft supports can be provided with a capacity to be lifted off at least in sections from the supporting parts in the glued region. The lack of connection of the supports with the supporting parts in the connecting region with the lenses allows a further deformation of the supports with the effect that the swiveling range of the lenses relative to the supporting parts is increased.

Especially simple constructional conditions are obtained when the flexurally soft supports form nose-pieces of the nose support, because in this case the flexurally soft nose-pieces which must be provided anyway can form a bonding layer required for an advantageous adhesive connection for the purpose of compensating tensions, so that separate supports can be omitted for this purpose.

The face-side fastening of the lenses with the help of the described adhesive connection is advantageously suitable for lens inserts which consist of two optical lenses as well as a nose support and which can be fastened to sunglasses for example. For this purpose the two optical lenses can be connected with each other via a flexurally soft, bow-shaped nose-piece and form a component which is exchangeable against a nose support with a nose-piece which is also bow-shaped, so that the respective spectacles can be used with or without the lens insert, this being with the advantage however that conventional, bow-shaped nose-pieces can be used.

For the optional connection of either the nose support or the lens insert, a plug-in coupling can be used whose coupling parts associated with the spectacles cooperate with flexurally rigid coupling parts which are injected on the flexurally soft nose-pieces both of the nose support as well as the lens insert. Since the standard shape of the flexurally soft nose-piece which is made of plastic will only be determined by the arrangement of the coupling parts associated with the spectacles because the coupling parts associated with the lens insert are not provided on flexurally rigid frames or intermediate carriers but on the legs of the flexurally soft nose-pieces, a plug-in coupling which is substantially independent of the shape and design of the spectacles is achieved between the spectacles and the nose-piece which can be adjusted to different distances and angular positions of the nose-piece legs. This applies not only to the nose support of spectacles without optical lens inserts, but also to optical lens inserts. In the standard shape of the nose-piece, the optical lenses of the lens insert are given their alignment relative to the spectacles receiving the lens insert. It is merely necessary to ensure a plug-in connection between the nose-piece and the spectacles via the plug-in coupling which ensures the alignment of the legs of the bow-shaped nose-piece, which can be ensured in a simple fashion by coupling parts which are sufficiently flexurally rigid for said fastener device, which coupling parts are injected onto the legs of the nose-piece.

Although the coupling set-offs which cooperate with the latching recesses for the formation of a plug-in coupling can be provided on different coupling sides, especially advantageous constructional conditions are obtained when the coupling parts consist of bridge-like coupling set-offs on the nose-piece of the nose support and the lens insert, which set-offs engage in oblong-shaped latching recesses of the spectacles. A fixing of the legs of the nose-piece relative to the spectacles which is protected against twisting is achieved via the bridge-like coupling set-offs and the oblong-shaped latching recesses. The latching recesses can be arranged, depending on the configuration of the spectacles, on an integral lens, on two spectacle lenses or on a frame for the lenses. In order to provide simple constructional conditions in this connection, the coupling parts which are associated with the nose-piece of the lens insert can be formed by supporting parts for the optical spectacle lenses.

The flexurally soft bonding layer formed by the nose-piece for the adhesive connection between the lenses and the supporting parts of the lens insert supports swiveling out the optical lenses from the spectacles without having to remove the lens insert. The deflection of the optical lenses against the elastic restoring force of the flexurally soft nose-piece which carries the same may lead to the optical lenses of the lens insert striking against the lenses of the spectacles per se. In order to avoid the likelihood of damage to the surface of the lenses, the optical lenses of the lens insert may carry spacers on their front side facing the spectacles in the region of a circumferential section opposite of the nose-piece, which spacer effectively prevents the lenses of the lens insert from striking against the lenses of the spectacles. Said spacers can also be used for better alignment of the optical lenses relative to the spectacles of sunglasses for example when during the insert of the lens insert into the sunglasses via the flexurally soft nose-piece a pretension is produced which presses the optical lenses with the spacers against the lenses of the sunglasses.

BRIEF DESCRIPTION OF THE DRAWINGS

The subject matter of the invention is now shown in the drawings by way of example, wherein.

DESCRIPTION OF THE PREFERRED EMBODIMENTS

Figure 1:
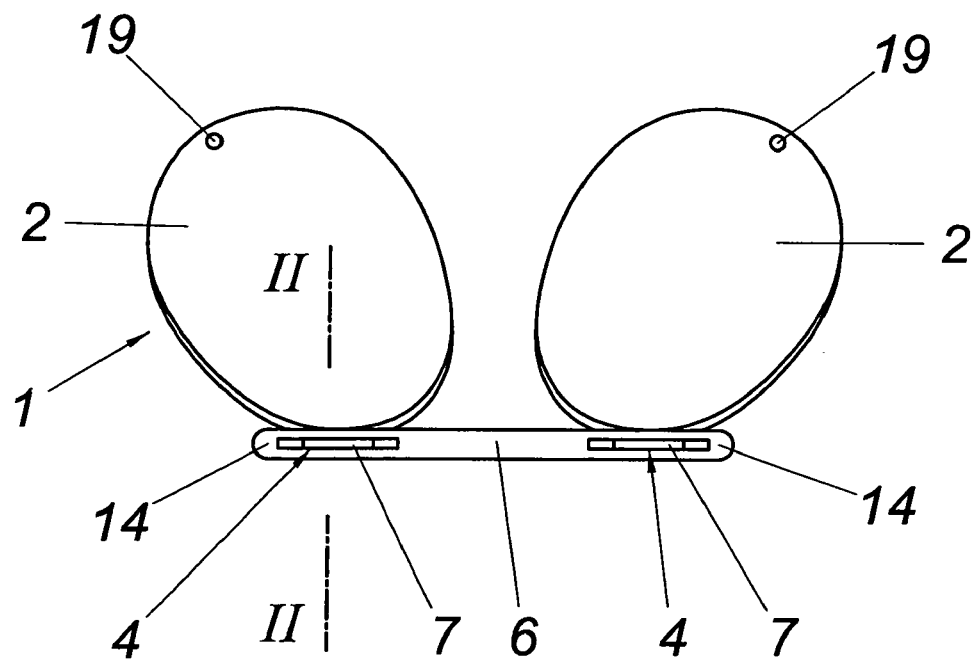
FIG. 1 shows an optical lens insert for spectacles with a fastener device in accordance with the invention for optical lenses in a view of the side facing the spectacles.
Figure 2:
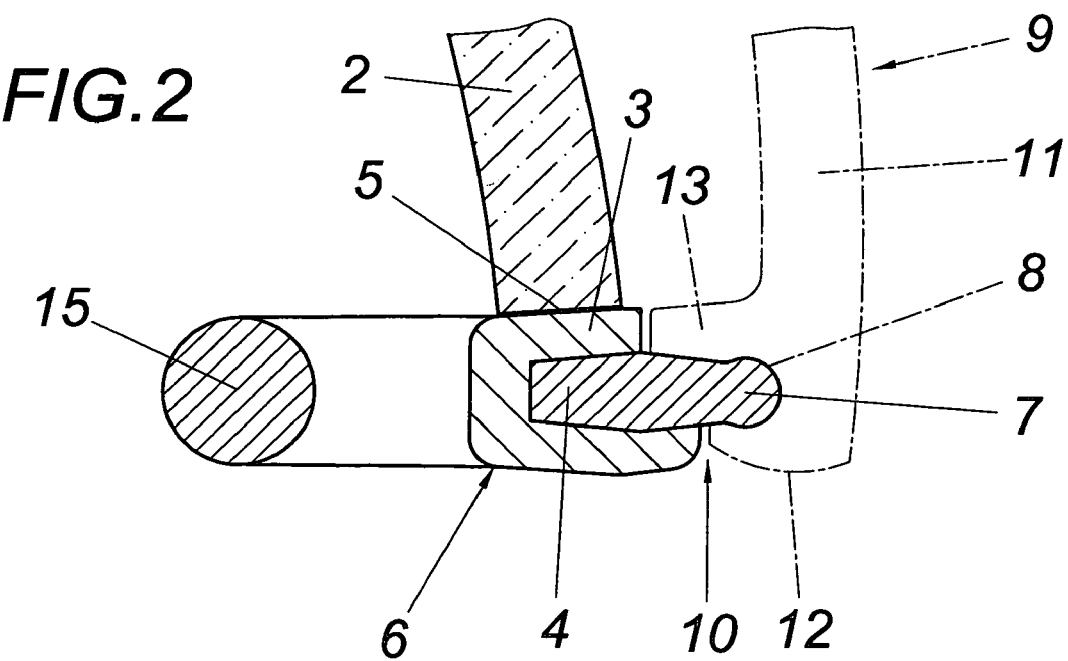
FIG. 2 shows a sectional view along line II—II of FIG. 1 on an enlarged scale.

The lens insert 1 consists according to FIGS. 1 and 2 of two optical lenses 2 which are fastened to supporting parts 4 which are provided with a flexurally soft support 3, this being through an adhesive layer 5 between the support 3, which support is made of plastic and is preferably injected onto the supporting parts 4, and a circumferential section of the face side of the lenses 2, as is shown in particular in FIG. 2. The supports 3 of the supporting parts 4 are mutually integrally connected to form a flexurally soft nose-piece 6 having a straight progress. The substantially flexurally rigid supporting parts 4 form bridge-shaped coupling parts 7 which latch into oblong-shaped latching recesses 8 of spectacles 9 and produce with the same a plug-in coupling 10 for fastening the optical lens insert.

Figure 3:
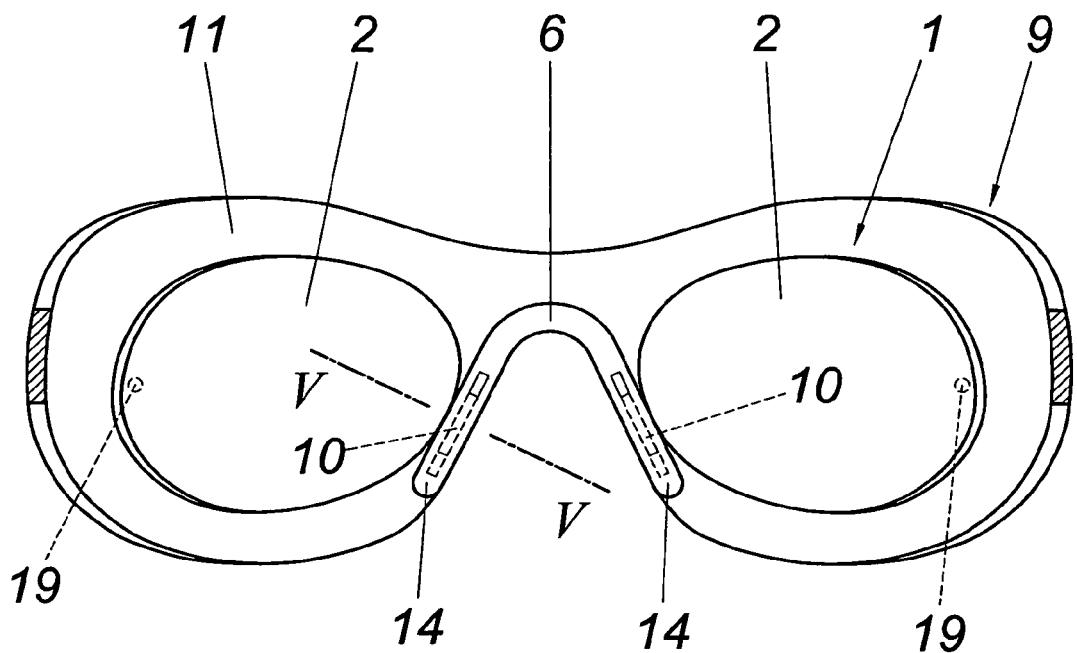
FIG. 3 shows spectacles with an optical lens insert in a view from the inside.
Figure 4:
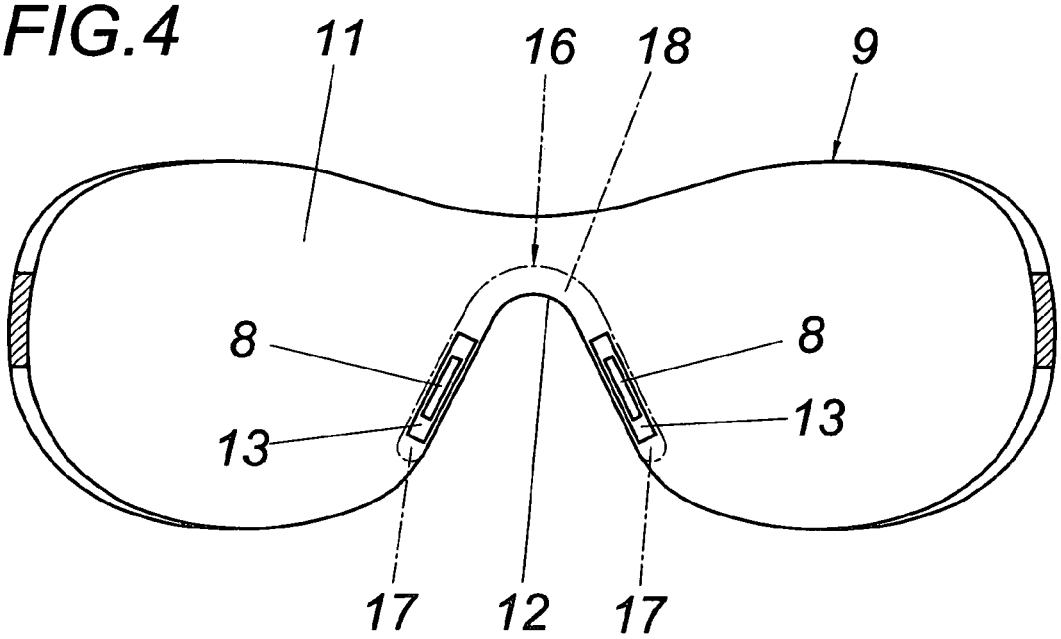
FIG. 4 shows the spectacles according to FIG. 3 in a view of the inside, but without the nose support and without the optical lens insert.

FIG. 4 shows such spectacles 9 in closer detail. It comprises an integral sunshield 11 which is used for protection against the sun and is provided with a nose recess 12. Along the edges of the recess, set-offs 13 for the oblong-shaped latching recesses 8 of the plug-in coupling 10 are provided on both sides of the nose recess 12 for the purpose of connecting the optical lens insert 1. It is only when the bridge-shaped coupling parts 7 are inserted into the latching recesses 8 of the sunshield 11 that the straight, flexurally soft nose-piece 6 is forced to assume the bow-like shape when being put to use, as is shown in FIG. 3. This means that the optical lenses 2 of the lens insert 1 merely need to be glued to the nose-piece 6 in an alignment adjusted to the spectacles 9 in order to obtain a fully functional lens insert 1 with frameless optical lenses 2. The arrangement of the nose-piece 6 can be made according to the requirements of the nose support of spectacles 9. The ends of the legs 14 of the nose-piece 6 can form a ring-like extension 15 for the purpose of widening the supporting surface, as is shown in FIG. 2.

If the spectacles 9 are used without the lens insert 1, the spectacles 9 must be provided with a separate nose support 16 because the nose-piece 6 of the lens insert 1 is no longer available for this purpose. In order to fasten the nose support 16 which is shown in FIG. 4 with the dot-dash line, latching recesses 8 can be used advantageously, into which engage respective coupling bridges of the nose support 16. Like the lens insert 1, the nose support 16 can comprise a nose-piece 18 which is made of a flexurally soft plastic material and comprises two legs 17, which nose-piece extends in a bow-like manner when in the used position, so that the optical lens insert 1 represents a modular unit that can be exchanged for the nose support 16 in a simple manner.

Figure 5:
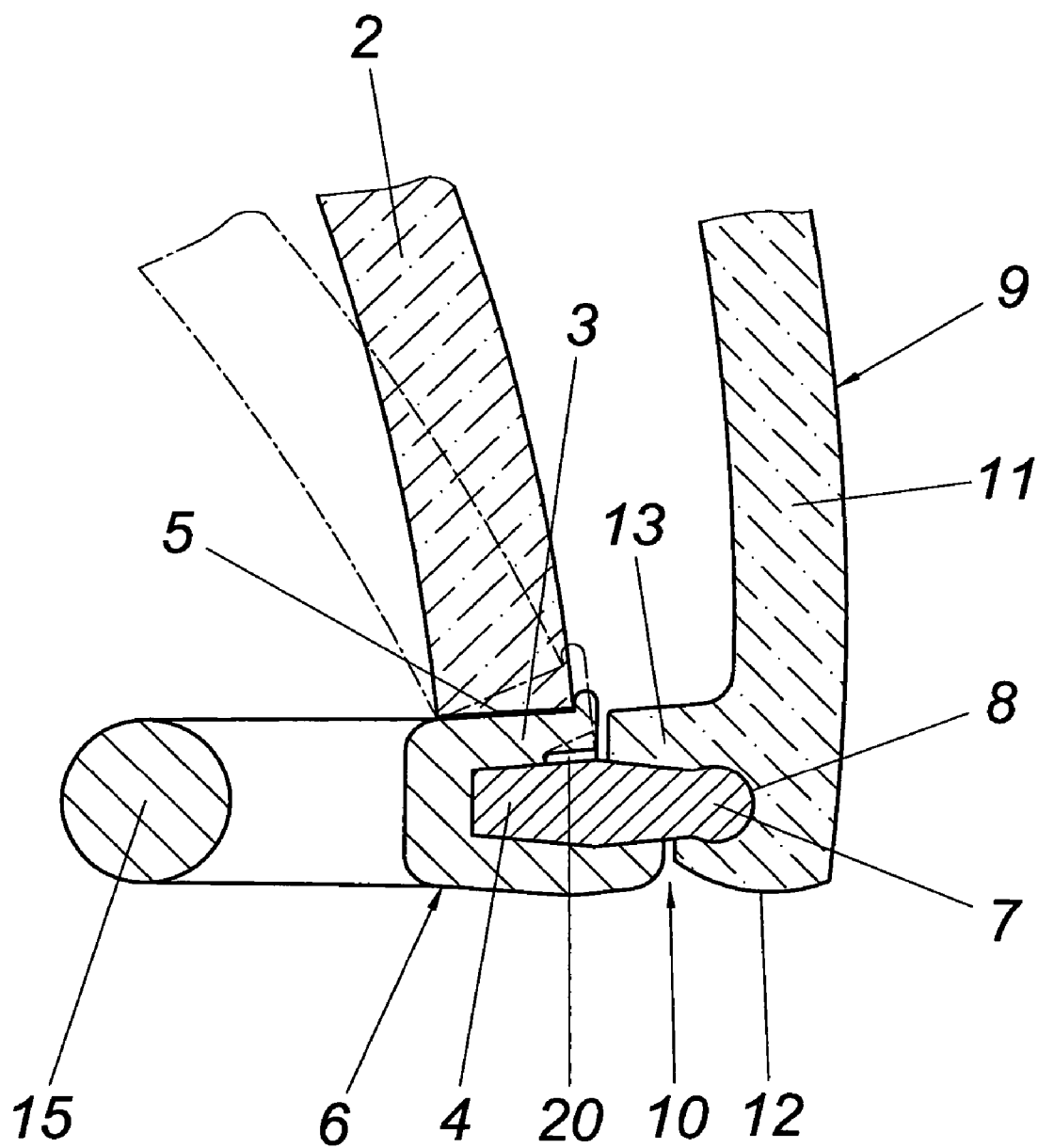
FIG. 5 shows a sectional view along line V—V of FIG. 3 on an enlarged scale.

The optical lenses 2 of the lens insert 1 can be provided on the side facing the spectacles 9 in the region of the edge zone opposite of the nose-piece 6 with a spacer 19 in form of a slightly projecting, knob-like set-off, so that said spacer 19 ensures that the optical lenses 2 do not strike against the sunshield 11 of the spectacles 9. Notice must be taken in this connection that the support 3 of the supporting parts 4 for the optical lenses 2 allow the optical lenses 2 to be swiveled out as a result of its flexurally elastic behavior, which allows cleaning the optical lenses 2 and the sunshield 11 without having to remove the lens insert 1. Despite the flexurally soft plastic, this swiveling out of the optical lenses 2 can lead to an overloading of the supports 3 or the adhesive layer 5 for fastening the lenses 2. In order to avoid such overloading the support 3 is locally released in the region of the gluing in accordance with FIG. 5, so that as a result of this release 20 the support 3 can be lifted from the supporting part 4, which allows a further deformation of the support 3, as is indicated in FIG. 5 with the dot-dash line. Despite the comparatively brittle adhesive layer 5, a sufficient swiveling of the lenses 2 for the purpose of cleaning the lenses 2 and the sunshield 11 can be ensured.

It is understood that the invention is not limited to the embodiments shown herein. Therefore the lens insert 1 could be connected in a non-detachable manner with the spectacles 9, such that the supporting parts 4 are associated with a non-detachable nose support of the spectacles 9 for example. Such an embodiment does not require any bow-shaped nose-piece 6 because no connection of the optical lenses 2 via the nose-piece 6 is required. Moreover, the frameless fastening of two lenses via a face-side adhesive connection by using a flexurally soft bonding layer in the form of a respective support of a supporting part could also be advantageously used in spectacles without a lens insert.

What is claimed is:

1. A fastener device for two frameless optical lenses having circumferential end faces and extending in a common plane, which comprises
   a nose support disposed between the two optical lenses;
   two supporting parts disposed on the nose support and projecting therefrom in a direction substantially perpendicular to the common plane; and
   flexurally soft plastic supports on the supporting parts, the supports not extending laterally beyond the nose support towards the optical lenses, a section of the circumferential end faces of the optical lenses being glued to the flexurally soft plastic supports.

2. A fastener device as claimed in claim 1, wherein parts of the soft supports glued to the lenses are adapted to be lifted off the supporting parts in a region.

3. A fastener device as claimed in claim 1, wherein the supports form nose-pieces of the nose support.

4. Spectacles comprising a bow-shaped nose support exchangeable with the nose support of a lens insert comprised of a modular unit consisting of the fastener device of claim 1.

5. Spectacles as claimed in claim 4, further comprising a plug-in coupling for connecting the nose support of the lense insert to the support of the spectacles, said coupling comprising flexurally rigid coupling parts on the nose support of the spectacles.

6. Spectacles as claimed in claim 5, wherein the coupling parts engage in oblong-shaped latching recesses of the spectacles.

7. Spectacles as claimed in claim 6, wherein the coupling parts associated with the nose-piece of the lens insert are formed by the supporting parts for the optical lenses.

8. Spectacles as claimed claim 6, wherein the optical lenses of the lens insert have a spacer on their front side facing the spectacles in a region of a circumferential section opposite of the nose-piece.

* * * * *